United States Patent
Liu et al.

(10) Patent No.: US 10,866,466 B2
(45) Date of Patent: Dec. 15, 2020

(54) LIQUID CRYSTAL PHASE SHIFTER, PHASE SHIFTING METHOD, AND METHOD OF FABRICATING THE LIQUID CRYSTAL PHASE SHIFTER

(71) Applicant: BOE TECHNOLOGY GROUP CO., LTD., Beijing (CN)

(72) Inventors: Mingxing Liu, Beijing (CN); Pengju Zhang, Beijing (CN); Hong Zhu, Beijing (CN); Hao Miao, Beijing (CN); Haiyan Sun, Beijing (CN); Rui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 63 days.

(21) Appl. No.: 16/177,901

(22) Filed: Nov. 1, 2018

(65) Prior Publication Data
US 2019/0243191 A1    Aug. 8, 2019

(30) Foreign Application Priority Data

Feb. 8, 2018  (CN) .......................... 2018 1 0129462

(51) Int. Cl.
G02F 1/1343    (2006.01)
G02F 1/1339    (2006.01)
G02F 1/1337    (2006.01)

(52) U.S. Cl.
CPC ...... *G02F 1/134309* (2013.01); *G02F 1/1339* (2013.01); *G02F 1/13378* (2013.01); *G02F 2203/50* (2013.01)

(58) Field of Classification Search
None
See application file for complete search history.

(56) References Cited

U.S. PATENT DOCUMENTS 5,223,687 A * 6/1993 Yuasa ...................... B23H 9/06
                                                          219/68
5,828,271 A   10/1998 Stitzer
(Continued)

FOREIGN PATENT DOCUMENTS

CN    105024115 A    11/2015
CN    106773338 A    5/2017
(Continued)

OTHER PUBLICATIONS

First Office Action for CN Appl. No. 201810129462.1, dated Feb. 7, 2020.

*Primary Examiner* — Edward J Glick
*Assistant Examiner* — David Y Chung
(74) *Attorney, Agent, or Firm* — Dinsmore & Shohl LLP

(57) ABSTRACT

This disclosure provides liquid crystal phase shifter, phase shifting method, and method of fabricating the liquid crystal phase shifter. The phase shifter comprises: a first substrate and a second substrate arranged in cell-aligned manner; a first electrode layer arranged on a side of the first substrate facing the second substrate; a second electrode layer arranged on a side of the second substrate facing the first substrate, and comprising electrically isolated electrode plates; and isolation zones arranged between the first electrode layer and the second substrate, wherein the isolation zones, the first electrode layer, and the second electrode layer form independent sealing areas, wherein each of the electrode plates corresponds to respective one of the sealing areas, and liquid crystal layers are sealed in the sealing areas, wherein dielectric constants of the liquid crystal layers in each sealing area are not exactly the same.

14 Claims, 3 Drawing Sheets

(56) References Cited

U.S. PATENT DOCUMENTS

| | | | | |
|---|---|---|---|---|
| 7,184,118 B2* | 2/2007 | Lee | .................. | G02F 1/133377 |
| | | | | 349/106 |
| 2008/0309840 A1* | 12/2008 | Yen | .................. | G02F 1/136213 |
| | | | | 349/48 |
| 2009/0128533 A1* | 5/2009 | Tsubata | ............... | G02F 1/13624 |
| | | | | 345/209 |
| 2012/0099038 A1* | 4/2012 | Yoshiga | ............ | G02F 1/133371 |
| | | | | 349/33 |
| 2013/0176198 A1* | 7/2013 | Katsuta | .................. | G02B 30/25 |
| | | | | 345/87 |
| 2016/0282689 A1* | 9/2016 | Zhang | ............... | G02F 1/134309 |
| 2018/0083364 A1* | 3/2018 | Foo | ................... | H01Q 15/0026 |
| 2018/0101037 A1* | 4/2018 | Feuillade | ............ | G02F 1/13473 |
| 2018/0120647 A1* | 5/2018 | Suh | .................. | G02F 1/133345 |
| 2018/0294557 A1* | 10/2018 | Lu | ......................... | H01Q 1/405 |

FOREIGN PATENT DOCUMENTS

| | | |
|---|---|---|
| CN | 106961008 A | 7/2017 |
| CN | 107611779 A | 1/2018 |

\* cited by examiner

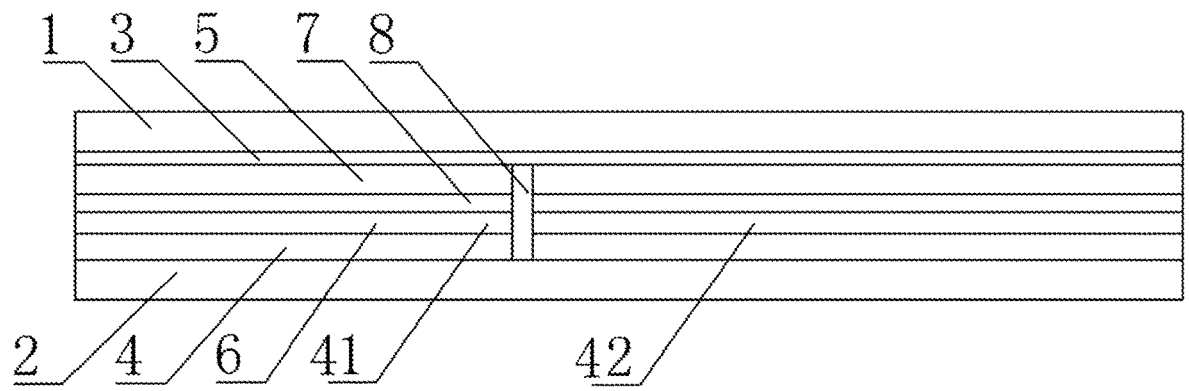

FIG. 2

```
┌─────────────────────────────────────────────────────────────────────┐
│ Applying the same voltage to the microstrip line structure and to the ground plate │
│                         in each sealing area                         │
└─────────────────────────────────────────────────────────────────────┘
                                   │
                                   ▼
┌─────────────────────────────────────────────────────────────────────┐
│ Applying phase-modulated voltages to the ground plates in each of the │
│                         sealing areas in turn                        │
└─────────────────────────────────────────────────────────────────────┘
```

FIG. 3

LIQUID CRYSTAL PHASE SHIFTER, PHASE SHIFTING METHOD, AND METHOD OF FABRICATING THE LIQUID CRYSTAL PHASE SHIFTER

CROSS-REFERENCE TO RELATED APPLICATIONS

This application claims the benefit of priority to Chinese Patent Application No. 201810129462.1, filed on Feb. 8, 2018, the entire contents of which are hereby incorporated by reference as part of this application.

TECHNICAL FIELD

This disclosure relates to a liquid crystal phase shifter, a phase shifting method, and a method of fabricating the liquid crystal phase shifter.

BACKGROUND

A phase shifter is a device capable of adjusting the phase of a wave, and it is widely used in radar, missile attitude control, accelerator, communication, instrument and apparatus and even music field. A liquid crystal phase shifter has a significant advantage in continuous phase modulation. Since the dielectric constant of the liquid crystal is small, the microstrip line and the phase shifter are usually longer to meet the requirement of phase modulation.

SUMMARY

This disclosure provides a liquid crystal phase shifter, comprising a first substrate and a second substrate arranged in a cell-aligned manner; a first electrode layer arranged on a side of the first substrate facing the second substrate; a second electrode layer arranged on a side of the second substrate facing the first substrate, and comprising a plurality of electrically isolated electrode plates; and a plurality of isolation zones arranged between the first electrode layer and the second substrate, wherein the plurality of isolation zones, the first electrode layer, and the second electrode layer form a plurality of independent sealing areas, wherein each of the electrode plates corresponds to respective one of the sealing areas, and liquid crystal layers are sealed in the sealing areas, wherein dielectric constants of the liquid crystal layers in each sealing area are not exactly the same.

According to one or more embodiments, the phase shifter further comprises a first orientation layer and a second orientation layer respectively arranged on both sides of the liquid crystal layers.

According to one or more embodiments, among the plurality of sealing areas, dielectric constants of the liquid crystals in the neighboring sealing areas are different.

According to one or more embodiments, the dielectric constants in the plurality of sealing areas are different.

According to one or more embodiments, the first electrode layer has a microstrip line structure, and the electrode plates are ground plates.

According to one or more embodiments, the liquid crystal phase shifter adopts a VA mode.

This disclosure further provides a phase shifting method comprising applying phase-modulated voltages to the ground plates in each of the sealing areas in turn.

According to one or more embodiments, the step of applying phase-modulated voltages to the ground plate in each of the sealing areas in turn further comprises applying the phase-modulated voltage to the ground plate in one of the plurality of sealing areas; and after the liquid crystal layer in the one of the plurality of sealing areas is turned, applying the phase-modulated voltage to the ground plate in another sealing area.

According to one or more embodiments, the phase-modulated voltages applied to the ground plates in each of the sealing areas are the same or different.

According to one or more embodiments, the phase shifting method further comprising: before applying the phase-modulated voltages to the ground plates in each of the sealing areas in turn, applying the same voltage to the first electrode layer and to the ground plate in each sealing area This disclosure provides a method of fabricating a liquid crystal phase shifter, comprising forming a first electrode layer pattern on a side of a first substrate through a pattering process; forming a second electrode layer pattern on a side of a second substrate through the pattering process; fabricating the first electrode layer into a microstrip line structure through a photolithography process; coating a first orientation layer on the first electrode layer; coating a second orientation layer on the second electrode layer; patterning the second electrode layer to obtain a plurality of electrically isolated electrode plates; arranging an isolation zone between the electrically isolated electrode plates on the second substrate; and arranging the first substrate and the second substrate in a cell-aligned manner, wherein the plurality of isolation zones are arranged between the first electrode layer and the second substrate and form a plurality of independent sealing areas, and liquid crystal layers are sealed in the sealing areas, wherein dielectric constants of the liquid crystal layers in each of the sealing areas are not exactly the same.

BRIEF DESCRIPTION OF THE DRAWINGS

Specific embodiments of this disclosure will be further described in detail in the following with reference to the accompanying drawings.

FIG. 2 shows a sectional view of the liquid crystal phase shifter in the present embodiment;

FIG. 3 shows a flowchart of the phase modulating method in the present embodiment;

DETAILED DESCRIPTION

To describe this disclosure more clearly, this disclosure will be further described in the following with reference to the embodiments and the accompanying drawings of this disclosure. Similar composite parts in the accompanying drawings are denoted by the same reference sign. Those skilled in the art would appreciate that, the contents specifically described below are illustrative but not restrictive, and are not regarded as limitations to the scope of protection of this disclosure.

Figure 1:
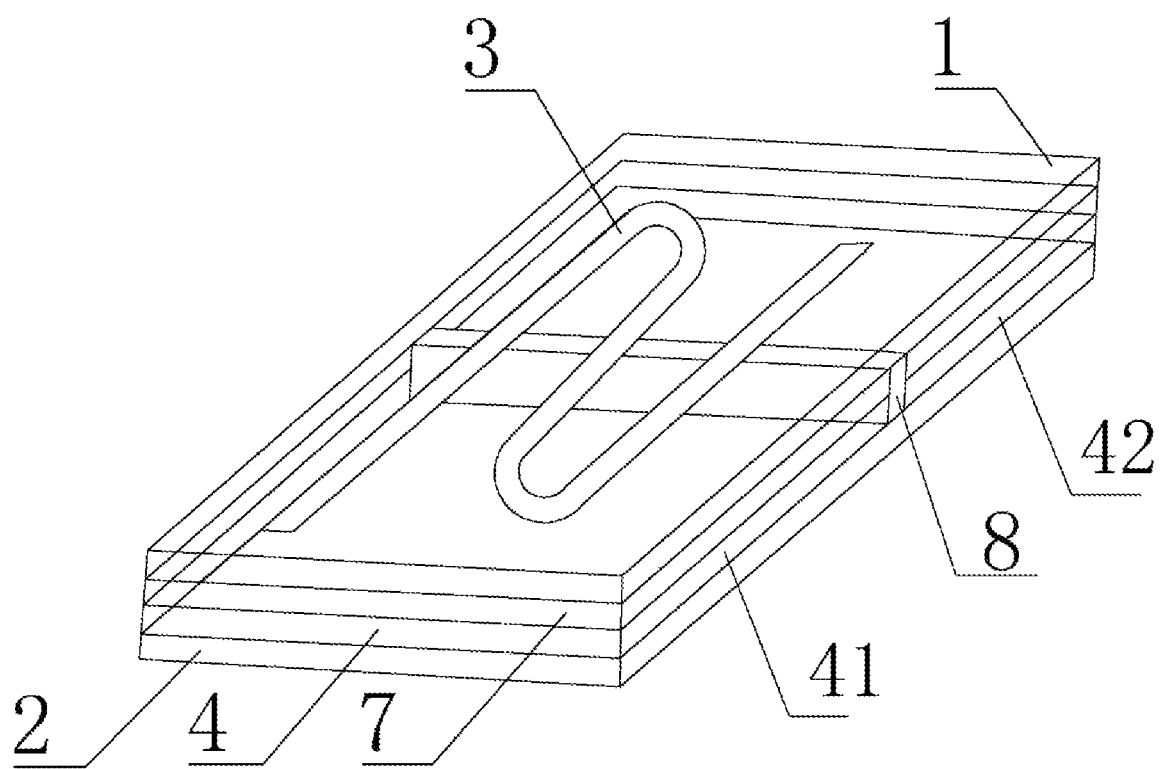
FIG. 1 shows a structure of the liquid crystal phase shifter in the present embodiment.

As shown in FIG. 1, a liquid crystal phase shifter comprises: a first substrate 1 and a second substrate 2 arranged in a cell-aligned manner; a first electrode layer 3 arranged on a side of the first substrate 1 facing the second substrate 2; a second electrode layer 4 arranged on a side of the second substrate 2 facing the first substrate 1, and comprising a plurality of electrically isolated electrode plates 41 and 42; and a plurality of isolation zones 8 arranged between the first electrode layer 3 and the second substrate 2, wherein the plurality of isolation zones 8, the first electrode layer 3, and the second electrode layer 4 form independent sealing areas. Each of the electrode plates corresponds to respective one of the sealing areas, liquid crystal layers 7 are sealed in the sealing area, and the dielectric constants of the liquid crystal layers in each of the sealing areas are not exactly the same.

In a specific embodiment of this disclosure, the first electrode layer 3 and the second electrode layer 4 are respectively arranged on the first substrate 1 and the second substrate 2, and the second electrode layer 4 comprises a plurality of electrically isolated electrode plates 41 and 42, and the liquid crystal layers 7 are arranged between the first electrode layer 3 and the second electrode layer 4. A plurality of isolation zones 8 are arranged between the first electrode layer 3 and the second substrate 2, and the isolation zone 8 can be sealant. There is a gap between neighboring electrode plates, and the isolation zone 8 exists in the gap between neighboring electrode plates, so the liquid crystal layers 7 can be isolated by the isolation zone 8 located at the gap between the neighboring electrode plates 41 and 42, so as to obtain a plurality of independent sealing areas. Each sealing area corresponds to an electrode plate 41 or 42, and the dielectric constants of the liquid crystals injected into each of the sealing areas are not exactly the same.

As shown in FIG. 2, specifically, in a specific implementation of this disclosure, this disclosure further comprises a first orientation layer 5 and a second orientation layer 6 respectively arranged on both sides of the liquid crystal layers 7. In one embodiment, the first orientation layer 5 is arranged between the first electrode layer 3 and the liquid crystal layers 7, and the second orientation layer 6 is arranged between the second electrode layer 4 and the liquid crystal layers 7. In this embodiment, the first orientation layer 5 and the second orientation layer 6 mainly play the role of controlling the orientation of the liquid crystal.

In one or more embodiments of this disclosure, among the plurality of sealing areas, the dielectric constants of the liquid crystals in neighboring sealing areas are different. In a specific implementation of this disclosure, the dielectric constants of the liquid crystals in neighboring sealing areas are different, so that a total dielectric constant of the liquid crystal layers 7 is a sum of the dielectric constants of the liquid crystals in each sealing area of the liquid crystal layers 7, to thereby increase the total dielectric constant of the liquid crystal layers 7, and further increase the phase shift degree of the liquid crystal phase shifter. For example, each sealing area is filled with liquid crystals with different dielectric constants $\varepsilon_1, \varepsilon_2, \ldots$, so the total dielectric constant of the liquid crystal layers are $\varepsilon=\varepsilon_1+\varepsilon_2+\ldots$. In contrast, in case where liquid crystals with two kinds of dielectric constants are mixed, the dielectric constant of the mixed liquid crystals is $\varepsilon=C_1\times\varepsilon_1+C_2\times\varepsilon_2$, where $C_1$ and $C_2$ are concentrations of the two kinds of liquid crystals, and $\varepsilon_1$ and $\varepsilon_2$ are dielectric constants of the two kinds of liquid crystals, so the dielectric constant of the mixed two kinds of liquid crystals is less than a sum of their dielectric constants before the mixing. Therefore, when the liquid crystals are mixed with each other, it will result in a decrease in the dielectric constant, thereby reducing the phase shift degree of phase shifter. In the embodiment of this disclosure, by dividing the liquid crystal layers, the first electrode layer and the second electrode layer into a plurality of sealing areas through the plurality of isolation zones, a decrease in the dielectric constant due to the mixing of the liquid crystals with each other can be avoided. In a specific implementation of this disclosure, because the total dielectric constant of the liquid crystal layers 7 is the sum of the dielectric constants of the liquid crystals in each sealing area of the liquid crystal layers 7, it is not needed to extend the liquid crystal phase shifter to increase its phase shift degree, thereby reducing the loss, and at the same time reducing the volume and weight of the liquid crystal phase shifter.

In one or more embodiments of this disclosure, the dielectric constants in the plurality of sealing areas are different. By making the dielectric constants of the liquid crystals in the plurality of sealing areas different, the total dielectric constant of the liquid crystal layers 7 is guaranteed to be the sum of the dielectric constants of the liquid crystals in each sealing area of the liquid crystal layers 7, thereby increasing the phase shift degree of the liquid crystal phase shifter.

Specifically, in a specific implementation of this disclosure, the first electrode layer 3 has a microstrip line structure, and the electrode plate of the second electrode layer 4 is a ground plate. That is to say, in use, by adjusting the voltage of the ground plate, the liquid crystals in the sealing area of the corresponding ground plate are turned, thereby changing the dielectric constant and achieving the purpose of phase modulation. It will be understood by those skilled in the art that the microstrip line structure refers to a transmission line of waves composed of conductor strips on a substrate, and a description thereof will be omitted herein.

Specifically, in a specific implementation of this disclosure, the liquid crystal phase shifter described in this disclosure adopts a VA (Vertical Alignment) mode. In other words, when the power is off or the microstrip line structure has the same voltage with the ground plate, the liquid crystals in the sealing area are arranged parallel to the electric field in order to reduce the loss.

In a specific embodiment of this disclosure, a phase shifting method of the liquid crystal phase shifter can be designed according to the liquid crystal phase shifter. The phase shifting method in a specific embodiment of this disclosure will be discussed specifically below in combination with FIG. 3, comprising the following step:

applying phase-modulated voltages to the ground plates in each of the sealing areas in turn.

Specifically, in a specific implementation of this disclosure, the phase shifting method further comprises:

applying the phase-modulated voltage to the ground plate in one of the plurality of sealing areas; and after the liquid crystals in the one of the plurality of sealing areas are turned, applying the phase-modulated voltage to the ground plate in another sealing area.

According to a specific embodiment of this disclosure, before applying phase-modulated voltages to the ground plates in each of the sealing areas in turn, the phase shifting method further comprises the following step:

applying the same voltage to the microstrip line structure and to the ground plate in each sealing area.

That is to say, in use, firstly, the same voltage is applied to the microstrip line structure and to the ground plate in each sealing area, so that the ground plate and the microstrip line structure maintain the same voltage. Since the liquid crystal phase shifter described in this disclosure adopts a VA mode, the liquid crystals in the sealing area are arranged parallel to the electric field. Thereafter, phase-modulated voltages are applied to the ground plates in each of the sealing areas in turn, so that the liquid crystals in the sealing areas are turned, thereby achieving the purpose of phase modulation.

Specifically, in a specific implementation of this disclosure, the phase-modulated voltages applied to the ground plates in each of the sealing areas can be the same or different.

Figure 4:
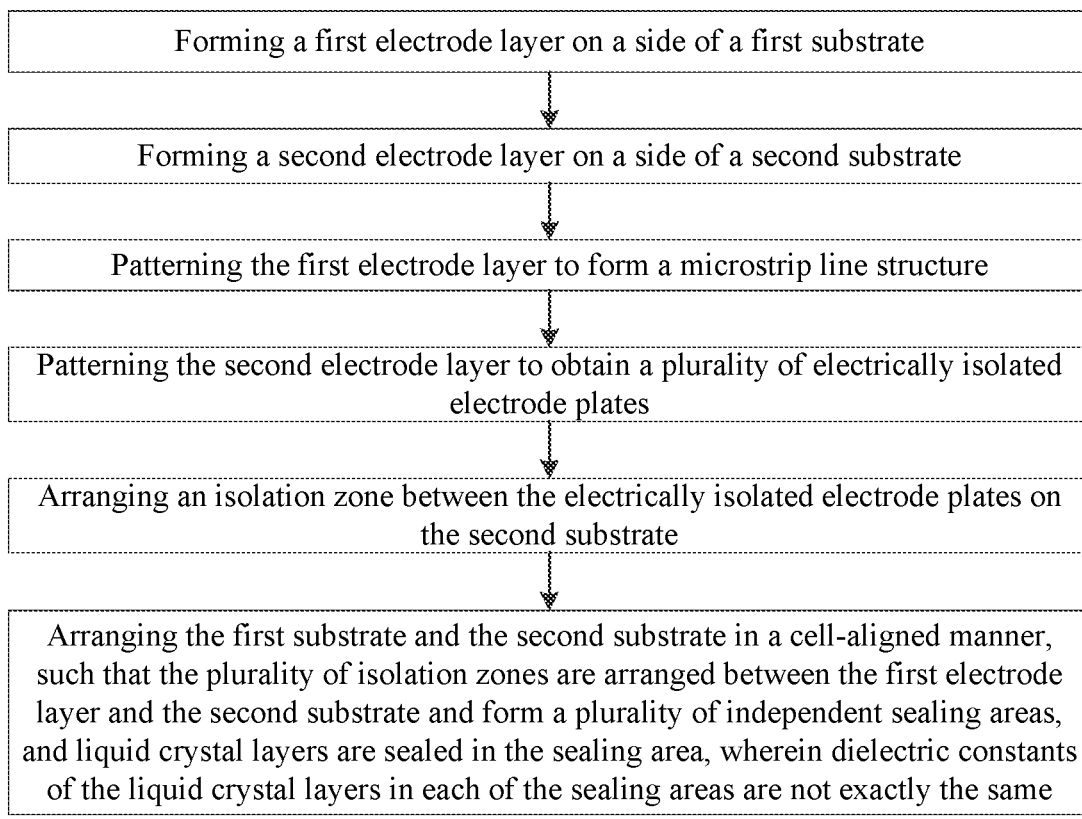
FIG. 4 shows a flowchart of the fabricating method in the present embodiment.

In a specific embodiment of this disclosure, a method of fabricating the liquid crystal phase shifter can be designed according to the liquid crystal phase shifter. The fabricating method in a specific embodiment of this disclosure will be discussed specifically below in combination with FIG. 4, comprising the following steps:

forming a first electrode layer 3 on a side of a first substrate 1;

forming a second electrode layer 4 on a side of a second substrate 2;

patterning the first electrode layer 3 so as to form a microstrip line structure;

patterning the second electrode layer 4 to obtain a plurality of electrically isolated electrode plates 41 and 42;

arranging an isolation zone 8 between the electrically isolated electrode plates 41 and 42 on the second substrate 2;

arranging the first substrate 1 and the second substrate 2 in a cell-aligned manner, wherein the isolation zone 8 is arranged between the first electrode layer 3 and the second substrate 2 and forms a plurality of independent sealing areas, and liquid crystal layers are sealed in the sealing areas, wherein the dielectric constants of the liquid crystal layers in each of the sealing areas are not exactly the same.

Specifically, in the fabricating method of this disclosure, the first electrode layer 3 is fabricated into the microstrip line structure through a photolithography process.

Specifically, in the fabricating method of this disclosure, the method further comprises a step of coating a first orientation layer 5 on the first electrode layer 3, and a step of coating a second orientation layer 6 on the second electrode layer 4.

The process of forming the first electrode layer 3 and the second electrode layer 4 is known to those skilled in the art, and thus is omitted here. The first electrode layer 3 formed on the first substrate 1 can be fabricated into a microstrip line structure through the photolithography process. Specific processing of the lithography process is known to those skilled in the art, and thus is omitted here. The second electrode layer 4 is patterned, so as to obtain a plurality of electrically isolated electrode plates 41 and 42. Patterning the second electrode layer 4 is mainly by an etching process, which is known to those skilled in the art and thus is omitted here. The first orientation layer 5 and the second orientation layer 6 are respectively coated on surfaces of the first electrode layer 3 and the second electrode layer 4. The coating process of coating the first orientation layer 5 and the second orientation layer 6 is known to those skilled in the art, and is omitted here. A plurality of isolation zones 8 are then arranged between the first electrode layer 3 and the second substrate 2. Due to the existence of gaps between the plurality of electrode plates 41 and 42, by arranging the plurality of isolation zones 8 in the gaps between the plurality of electrode plates, a plurality of sealing areas can be obtained between the first electrode layer 3 and the second electrode layer 4. By injecting liquid crystals with not exactly the same dielectric constant into the plurality of sealing areas between the first electrode layer 3 and the second electrode layer 4, the liquid crystals with the different dielectric constants are sealed into the plurality of independent sealing areas.

Evidently, the above embodiments of this disclosure only serve to clearly describe the examples listed in this disclosure, but not limit the embodiments of this disclosure. Those skilled in the art could make other different forms of variations or modifications on the basis of the description, and although all the possible embodiments cannot be exhaustively listed herein, all these variations or modifications that can be obviously derived from the technical solutions of this disclosure still are within the scope of protection of this disclosure.

What is claimed is:

1. A liquid crystal phase shifter, comprising:
   a first substrate and a second substrate arranged in a cell-aligned manner;
   a first electrode layer arranged on a side of the first substrate facing the second substrate;
   a second electrode layer arranged on a side of the second substrate facing the first substrate, and comprising a plurality of electrically isolated electrode plates; and
   a plurality of isolation zones arranged between the first electrode layer and the second substrate, wherein the plurality of isolation zones, the first electrode layer, and the second electrode layer form a plurality of independent sealing areas, wherein each of the electrode plates corresponds to respective one of the sealing areas, and liquid crystal layers are sealed in the sealing areas, wherein dielectric constants of the liquid crystal layers in each sealing area are not exactly the same when phase-modulated voltages are not applied to the first electrode layer and the second electrode layer.

2. The liquid crystal phase shifter according to claim 1, further comprising a first orientation layer and a second orientation layer respectively arranged on both sides of the liquid crystal layers.

3. The liquid crystal phase shifter according to claim 1, wherein, among the plurality of sealing areas, the dielectric constants of the liquid crystal layers in neighboring sealing areas are different when phase-modulated voltages are not applied to the first electrode layer and the second electrode layer.

4. The liquid crystal phase shifter according to claim 1, wherein the dielectric constants of the liquid crystal layers in the plurality of sealing areas are different when phase-modulated voltages are not applied to the first electrode layer and the second electrode layer.

5. The liquid crystal phase shifter according to claim 1, wherein the first electrode layer has a microstrip line structure, and the electrode plates are ground plates.

6. The liquid crystal phase shifter according to claim 1, wherein the liquid crystal phase shifter adopts a vertical alignment mode.

7. A phase shifting method of a liquid crystal phase shifter, wherein the phase shifter comprises:
   a first substrate and a second substrate arranged in a cell-aligned manner;
   a first electrode layer arranged on a side of the first substrate facing the second substrate;
   a second electrode layer arranged on a side of the second substrate facing the first substrate, and comprising a plurality of electrically isolated electrode plates; and
   a plurality of isolation zones arranged between the first electrode layer and the second substrate, wherein the plurality of isolation zones, the first electrode layer, and the second electrode layer form a plurality of independent sealing areas, wherein each of the electrode plates corresponds to respective one of the sealing areas, and liquid crystal layers are sealed in the sealing areas, wherein dielectric constant of the liquid crystal layers in each sealing area are not exactly the same when phase-modulated voltages are not applied to the first electrode layer and the second electrode layer, the phase shifting method comprising applying the phase-modulated voltages to the ground plates in each of the sealing areas in turn.

8. The phase shifting method according to claim 7, wherein the step of applying phase-modulated voltages to the ground plate in each of the sealing areas in turn further comprises:

applying the phase-modulated voltage to the ground plate in one of the plurality of sealing areas; and after the liquid crystal layer in the one of the plurality of sealing areas is turned, applying the phase-modulated voltage to the ground plate in another sealing area.

9. The phase shifting method according to claim 7, wherein the phase-modulated voltages applied to the ground plates in each of the sealing areas are the same.

10. The phase shifting method according to claim 7, wherein the phase-modulated voltages applied to the ground plates in each of the sealing areas are different.

11. The phase shifting method according to claim 7, further comprising:

before applying the phase-modulated voltages to the ground plates in each of the sealing areas in turn, applying the same voltage to the first electrode layer and to the ground plate in each sealing area.

12. A method of fabricating a liquid crystal phase shifter, comprising the following steps:

forming a first electrode layer on a side of a first substrate;

forming a second electrode layer on a side of a second substrate;

patterning the first electrode layer into a microstrip line structure;

patterning the second electrode layer to obtain a plurality of electrically isolated electrode plates;

arranging a plurality of isolation zones between the electrically isolated electrode plates on the second substrate;

arranging the first substrate and the second substrate in a cell-aligned manner, wherein the plurality of isolation zones are arranged between the first electrode layer and the second substrate and form a plurality of independent sealing areas, and liquid crystal layers are sealed in the sealing areas, wherein dielectric constants of the liquid crystal layers in each of the sealing areas are not exactly the same when phase-modulated voltages are not applied to the first electrode layer and the second electrode layer.

13. The fabricating method according to claim 12, further comprising:

coating a first orientation layer on the first electrode layer; and coating a second orientation layer on the second electrode layer.

14. The fabricating method according to claim 12, wherein the first electrode layer is patterned by photolithography process.

* * * * *